H. M. GILLESPIE.
ROTARY ENGINE.
APPLICATION FILED MAR. 21, 1917.
1,330,257.
Patented Feb. 10, 1920.
9 SHEETS—SHEET 2.
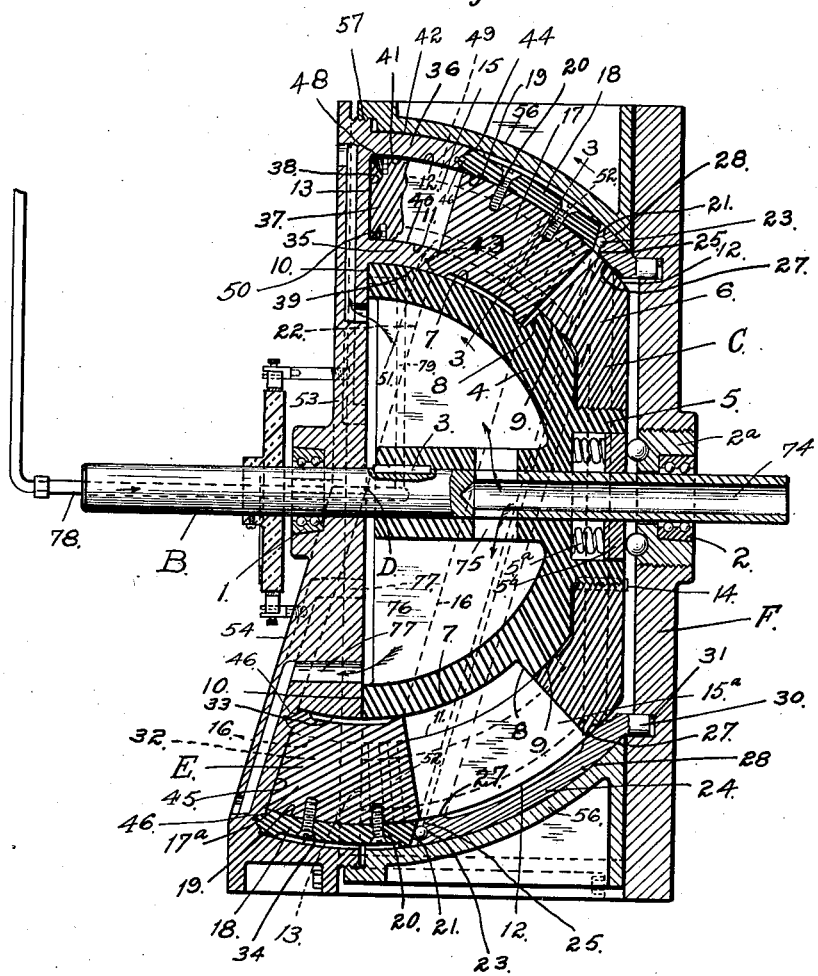
Fig. 2.
Fig. 3.
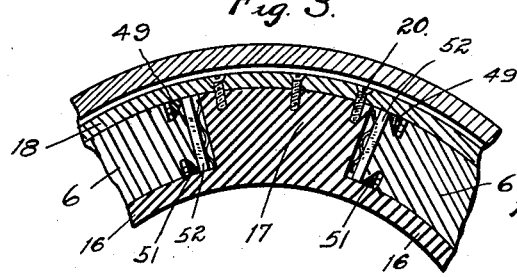
INVENTOR
Harvey M. Gillespie

H. M. GILLESPIE.
ROTARY ENGINE.
APPLICATION FILED MAR. 21, 1917.

1,330,257.

Patented Feb. 10, 1920.
9 SHEETS—SHEET 3.

INVENTOR
Harvey M. Gillespie

H. M. GILLESPIE.
ROTARY ENGINE.
APPLICATION FILED MAR. 21, 1917.

1,330,257.

Patented Feb. 10, 1920.
9 SHEETS—SHEET 4.

INVENTOR
Harvey M. Gillespie

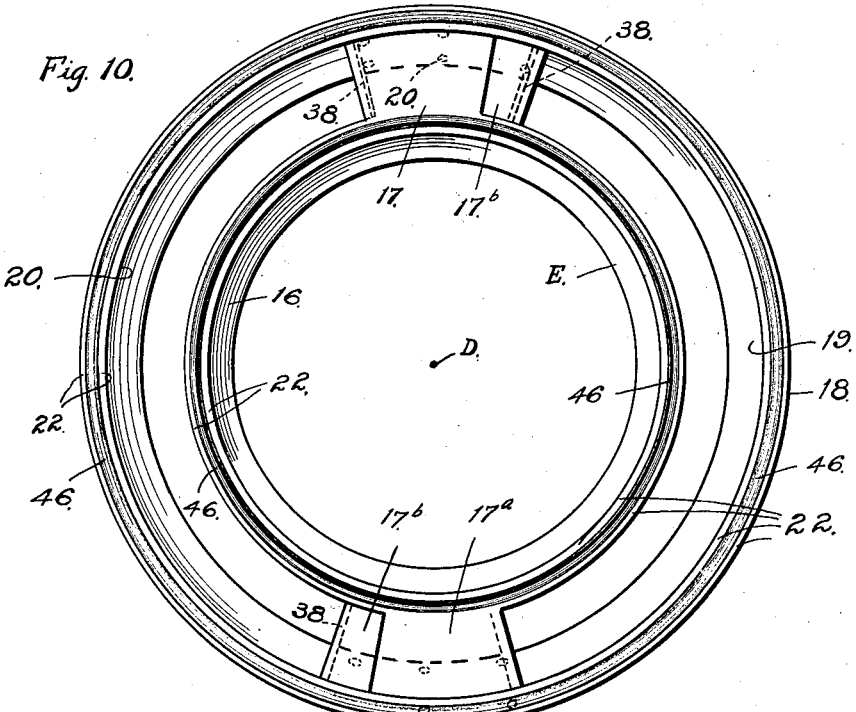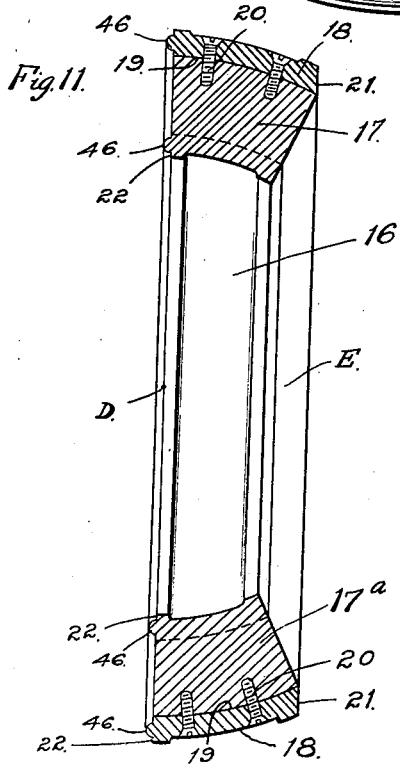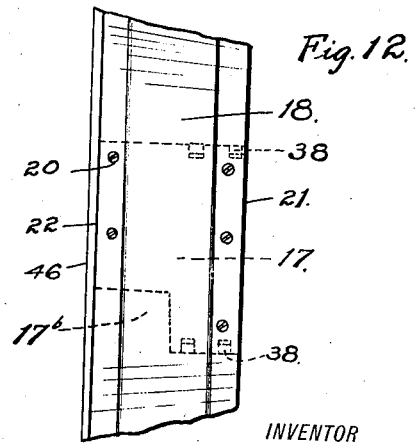

H. M. GILLESPIE.
ROTARY ENGINE.
APPLICATION FILED MAR. 21, 1917.

1,330,257.

Patented Feb. 10, 1920.
9 SHEETS—SHEET 6.

INVENTOR
Harvey M. Gillespie

H. M. GILLESPIE.
ROTARY ENGINE.
APPLICATION FILED MAR. 21, 1917.
1,330,257.
Patented Feb. 10, 1920.
9 SHEETS—SHEET 7.
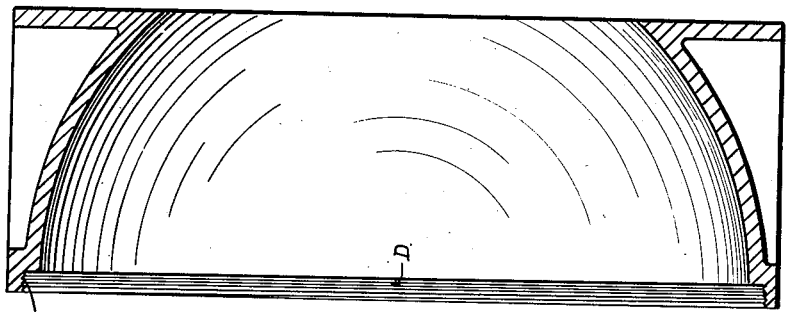
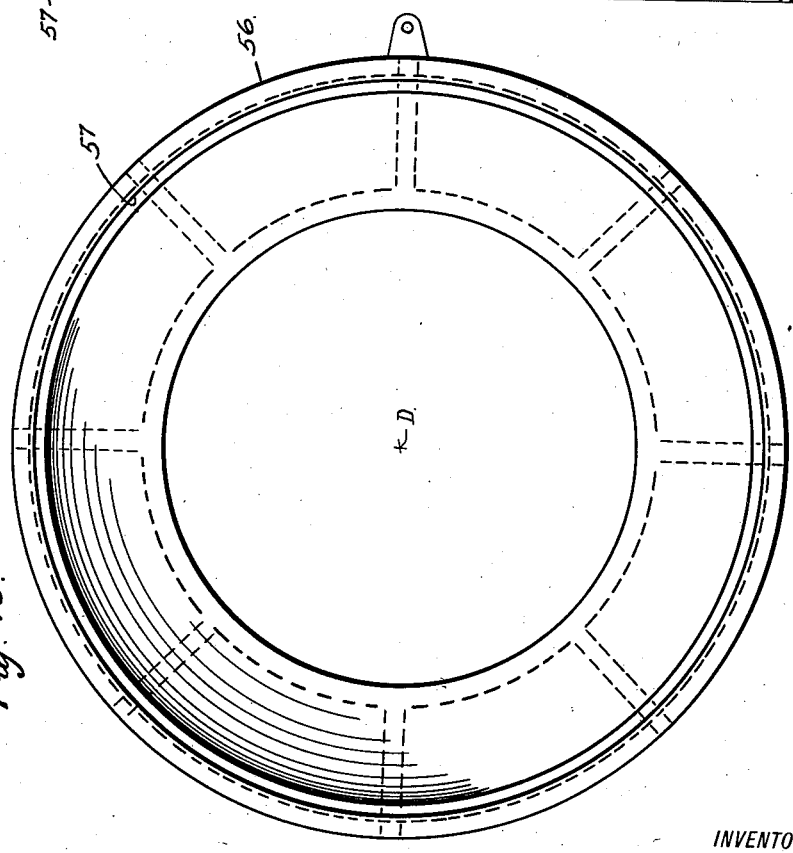
INVENTOR
Harvey M. Gillespie

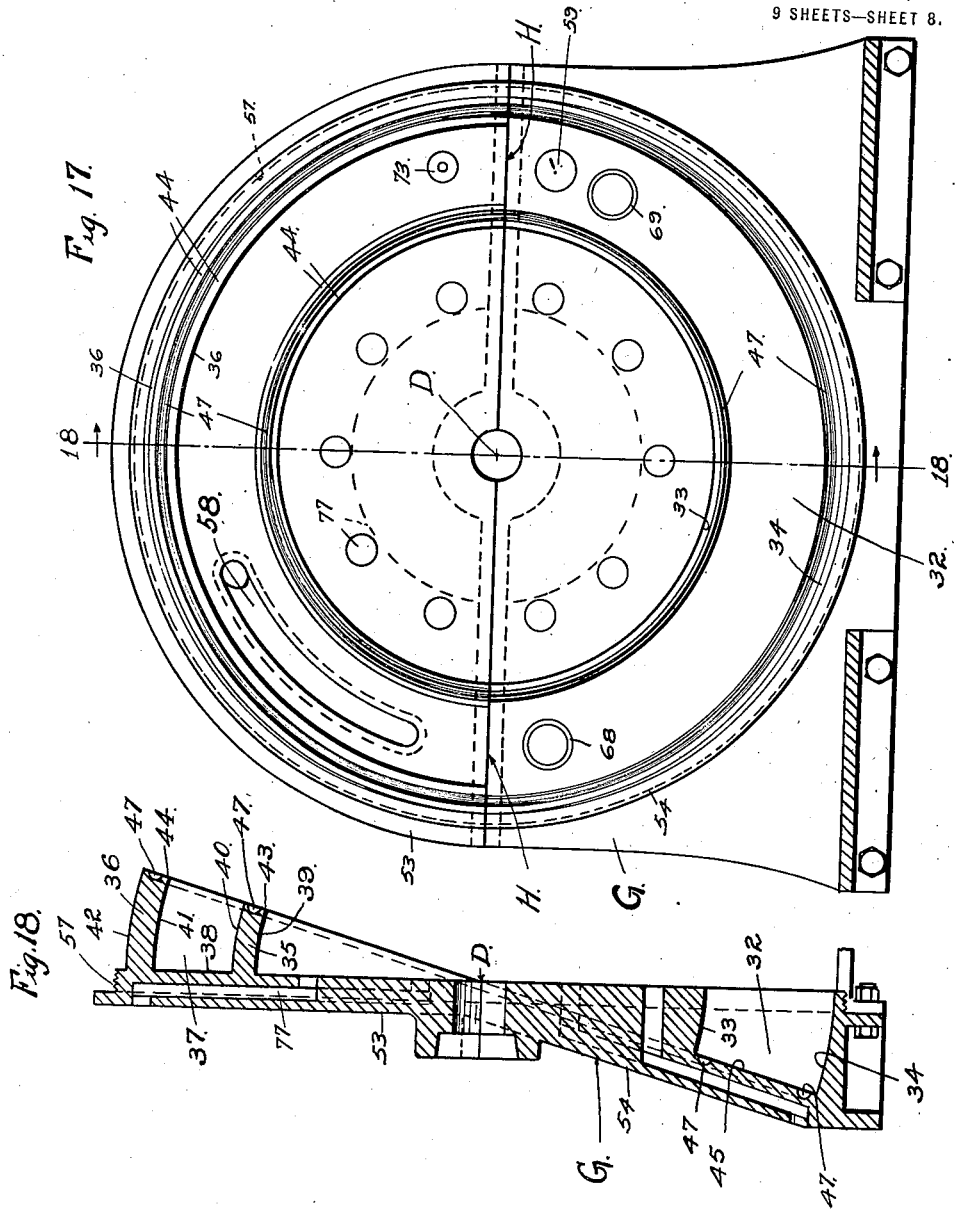

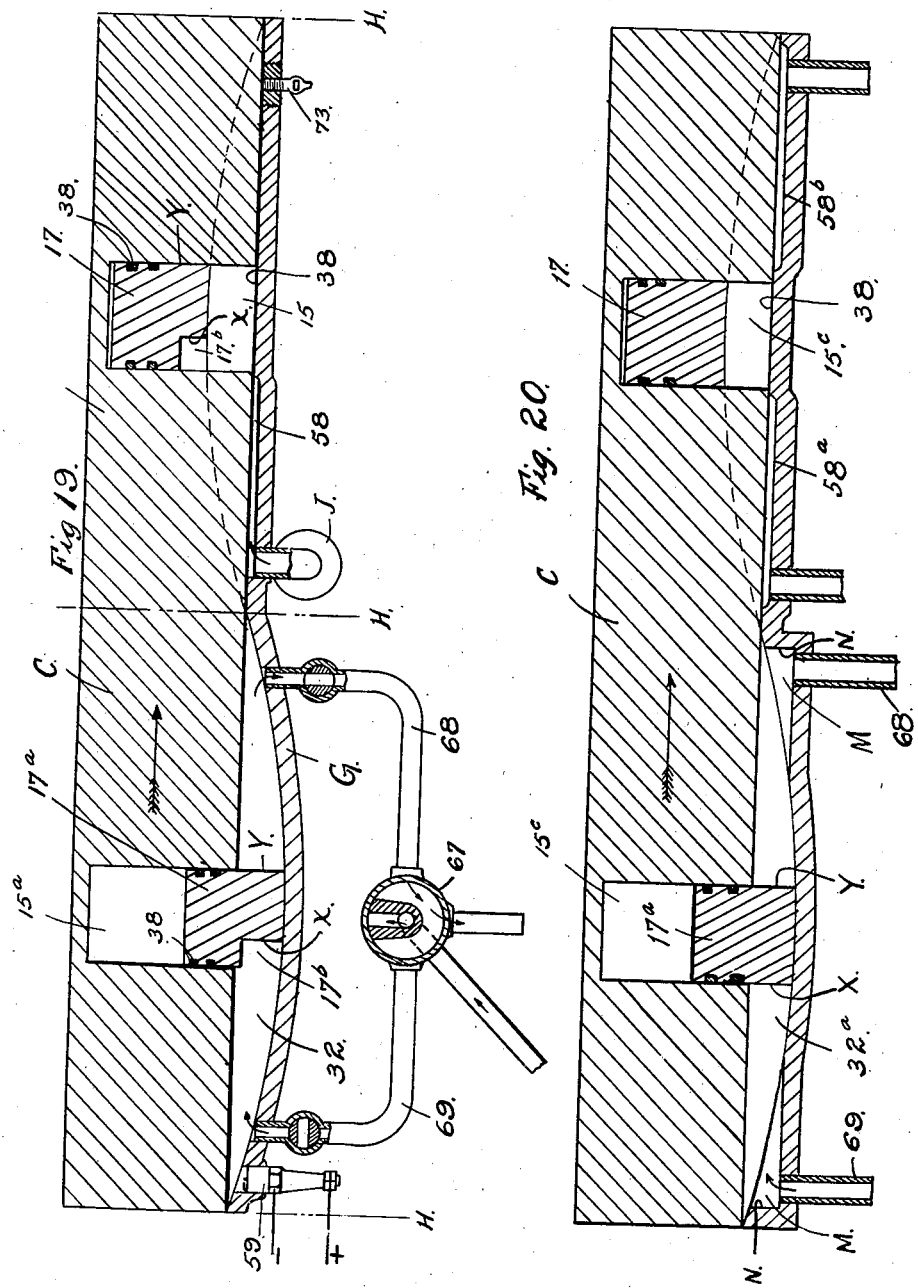

UNITED STATES PATENT OFFICE.

HARVEY M. GILLESPIE, OF CHICAGO, ILLINOIS.

ROTARY ENGINE.

1,330,257.   Specification of Letters Patent.   Patented Feb. 10, 1920.

Application filed March 21, 1917. Serial No. 156,242.

*To all whom it may concern:*

Be it known that I, HARVEY M. GILLESPIE, a citizen of the United States, residing at Chicago, in the county of Cook and State of Illinois, have invented certain new and useful Improvements in Rotary Engines, of which the following is a specification.

My invention relates to rotary engines, and particularly to the type of rotary engine adapted to be operated with expansive fluids, such as water under pressure, compressed air, steam, or with such fluids as may be used to operate the type of engine generally termed explosive or internal combustion engines.

The objects of my invention may be briefly stated as consisting in the provision of a novel and improved rotary engine in which the following functions and operations are attained, either jointly or severally, in an improved manner: To provide an improved structure in which the expansive force of the operating means may be exerted directly against the rotating member or members; to provide novel and improved means for minimizing the leakage of the operating medium; to provide a novel and improved structure in which the direction of rotation may be reversed; to provide a new and improved engine structure in which the operative parts do not move into and out of engagement in such a manner as to cause a pounding action in the engine or any other abrupt starting or stopping of the operative parts such as is frequent in engines of the above type in which reciprocating devices are employed; to provide improved means for applying a lubricant to the surfaces requiring lubrication; to provide an improved engine structure in which novel means are provided for taking up wear and for compensating for expansion and contraction of the various parts; to provide an improved structure adapted to be operated interchangeably with various operating mediums; to provide improved means for direct application of a cooling medium to the rotor when such cooling of the engine is desirable; to provide a novel and improved structure whereby abutments adapted to be rotated or otherwise moved so as to permit the piston to pass the same, may be dispensed with.

A common objection to the various types of direct pressure rotary engines is that the area of the contacting bearing surfaces of the piston or vane and the stator is insufficient to provide an effective packing to prevent the expansive fluid from escaping between these contacting surfaces. It has likewise been found difficult to prevent leakage of the operating fluid at other points in the working chamber. This is especially true when a high pressure is admitted to the chamber. Another objection to the engines of the above type, and particularly to the types employing spring pressed abutments, which are moved into and out of operative engagement with other coöperating elements, is that such action causes an undesirable pounding which is likely to result in marring or otherwise injuring the finished surfaces against which they are usually intended to bear.

My invention contemplates as one of its specific objects to provide improved structural features with which such undesirable results as above referred to will be obviated. These results are eliminated with my invention, particularly by the provision of a piston or vane having a bearing surface of considerable area which is in constant engagement with the bearing surface with which it coöperates. This object is further effected and rendered possible by the provision of a structure in which the rotor and the piston may operate in fixed planes.

Another specific object of the invention is to provide an improved structure in which the rotor and piston may operate on fixed planes which intersect one with the other.

A further specific object of the invention is to provide an improved rotary engine structure which may be operated by means of an internal combustion and in which suitable means are provided for introducing an explosive fluid into the engine, compressing the same, igniting the compressed charge and discharging the products of combustion during one cycle of the rotor.

Another specific object of the invention is to utilize the centrifugal force of the rotor for introducing air into the rotor casing so as to cool the rotor and such other parts likely to become overheated, and to convey lubricant to the bearing surfaces requiring lubrication.

The invention has for further objects the novel arrangements, constructions and combination of parts and associated devices hereinafter more specifically described and claimed.

The invention is illustrated in the accompanying drawings in which like characters of reference designate like parts, and in which—

Fig. 2 is a vertical sectional view of the structure shown in Fig. 1.

Fig. 3 is a fragmentary sectional view through the rotor and piston to show my preferred means of packing these members to prevent the escape of the operating medium, said view being taken on line 3—3 of Fig. 2, looking in the direction indicated by the arrows.

Fig. 10 is a front view, in elevation, of my preferred form of piston element.

Fig. 11 is a vertical section of the same.

Fig. 12 is a fragmentary view, in elevation, looking down on the top of Fig. 10.

Figs. 15 and 16 are front elevation and vertical sectional view, respectively, of one of the members employed in my preferred construction.

Fig. 17 is a view, in elevation, of the stator looking at the inner side thereof.

Fig. 18 is a sectional view taken on line 18—18 of Fig. 17.

Fig. 19 is a diagrammatic view illustrating the manner of operating my improved engine, and Fig. 20 is a similar diagrammatic view illustrating a modification.

Figure 1:
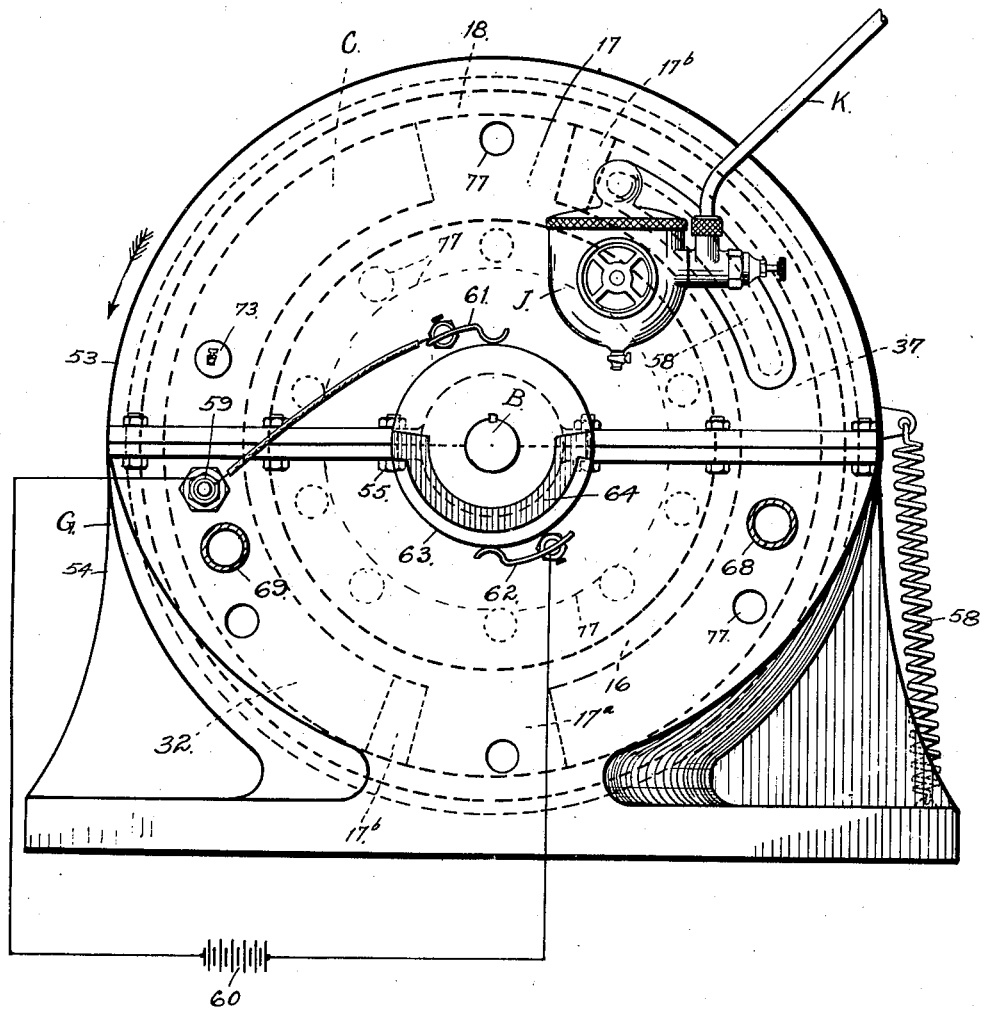
Figure 1 is a side elevation, with certain parts in section, of my improved engine structure, constructed so as to be capable of being operated interchangeably with steam, for example, or with naphtha, or other explosive fluids.
Figure 4:
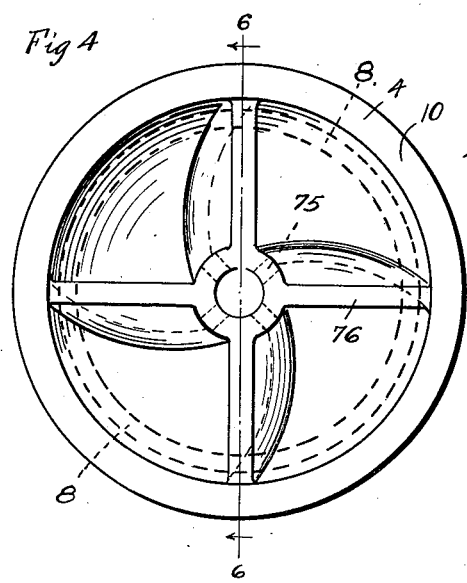
Figs. 4 and 5 are front and back views, respectively, of one of the members constituting a part of my preferred form of rotor.
Figure 5:
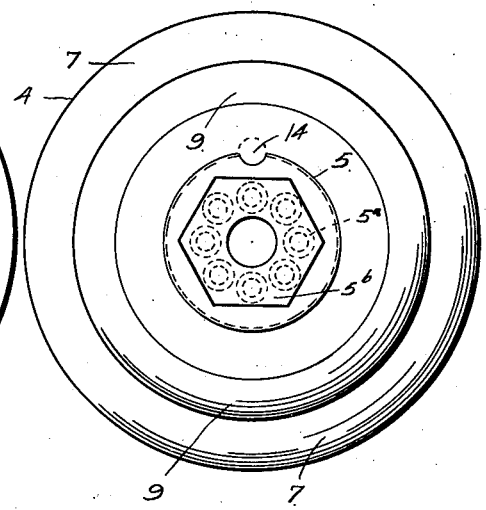
Figure 6:
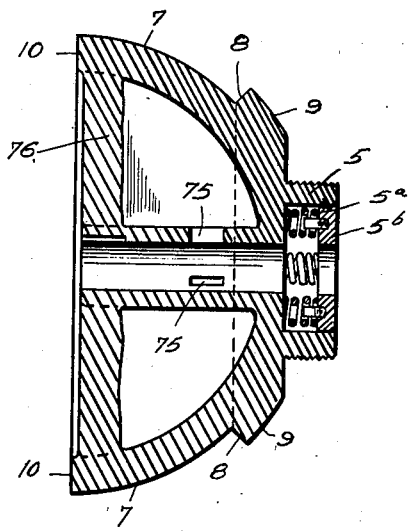
Fig. 6 is a vertical sectional view taken on line 6—6 of Fig. 4.
Figure 7:
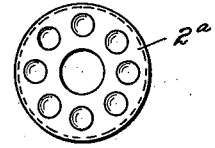
Fig. 7 is a view in elevation, of a thrust bearing adapted to bear against the hub of the member illustrated in the three preceding figures.

In the drawings I have illustrated my invention in connection with the construction adapted to be operated interchangeably with various forms of operating mediums such, for example, as compressed air, steam, naphtha or other like operating mediums adapted to be used in connection with various known types of rotary engines.

It will be apparent, after reading the following description of my invention, that numerous modifications in structure may be made for accomplishing substantially the same functions and adapted for the various uses to which my invention may be advantageously applied, without departure from the spirit of my invention. I, therefore, wish it to be understood that my invention contemplates all such forms of structure which come within the scope of the appended claims for accomplishing any or all of the objects above set forth either separately or jointly, and that I intend to claim both broadly and specifically in so far as the development of the prior art will permit a structure suitable for carrying out the objects of my invention as an engine, or for such other uses as the structure disclosed may be suitable or adapted.

Referring to the drawings, B designates a shaft rotatably mounted in suitable antifriction bearings 1 and 2. A rotor, designated generally at C, is preferably fixed to the shaft by any suitable means such, for example, as the key 3. In order that the various coöperating parts of my invention may be more readily assembled, I preferably, though not necessarily, construct the rotor with an inner member 4 having a hub 5 and an outer or peripheral member 6 having a threaded engagement with the hub 5. The inner member 4 of the rotor is formed with a bounding surface 7, the inner edge of which terminates in an annular shoulder 8. The member 4 is also provided with another bounding surface 9, the arc of which is preferably made with a larger radius than the surface 7. The radii forming the said bounding surfaces are struck from a common point on the axis of rotation of the rotor which is preferably in alinement with the outer bearing face 10 of the rotor and is indicated in the drawings by the reference character D. The outer or peripheral member 6 of the rotor is of a bowl shaped configuration and is formed with an inner bounding surface 11 and, being struck from the common point D, has the same radius as the surface 9 and is adapted, when in operative position, to fit tightly against the surface 9. The outer bounding surface 12 of the member 6 is likewise formed with a radius struck from the common point D and with a vertical face 13 which alines with the face 10 of the member 4. The rotor members 4 and 6 are held against any relative movement by means of the key 14 which may be driven into suitable key-ways in the threaded portion of the hub 5 after the parts are screwed into operative position. When the members 4 and 6 are in their operative position, as shown in Fig. 2, the space intervening between the surfaces 7 and 11 form an annular channel, arcuate in cross section, in which one member of the piston element is slidably fitted, in the manner hereinafter described. The periphery of the member 6 is cut away, as indicated at 15, 15ª, so as to provide a plurality of radial slots, the side and back walls of which taper toward the common point D (see Figs. 2, 8 and 9). In the drawings I have shown two of such slots, though it should be understood that any number of these slots may be provided as may be found desirable, the number only being limited by the size of the slot and the circumference of the periphery.

The piston element E is composed of an annular member 16 having radial projections 17, 17ª, cut away as at 17ᵇ, which are preferably formed integral with the member 16 and slidably fitted in the radial slots 15, 15ª, respectively, of the rotor member 6, while the annular member 16 is formed with arcuate surfaces corresponding to the surfaces 7 and 11, and fitted into the channel provided by the space intervening between the said surfaces 7 and 11 so as to be capable of a sliding arcuate movement therein. The projections 17, 17ª have been shown and described as being formed integral with the member 16, though it is obvious that they could be made separate and bolted or otherwise secured to the member 16 if such construction should be desirable. A second annular member or connecting ring 18 is formed with an inner bounding surface 19 corresponding to the surface 12 of the rotor member and is fitted to the periphery of the members 17, 17ª and permanently secured thereto as by means of screw bolts 20. The inner edge 21 of the ring 18 is preferably formed parallel with the edge 22 of the member 16 so as to provide a desirable finished surface constituting a suitable ball race for ball bearings 23. When the piston element is assembled and applied to the rotor C, as indicated in Fig. 2, the piston element as a whole is preferably held at an angle with respect to the vertical faces 10 and 13 of the rotor by means of the thrust bearing member 24 which is provided with an annular surface 25 standing in a fixed parallel relation with respect to the surface 20 of the piston element C and is formed with suitable cavities 26 in which the ball bearings 23 may be seated. The thrust bearing member 24 is formed with an inner bounding surface 27 formed with a radius struck from the point D and corresponding in curvature to the surface 12 of the peripheral member 6 of the rotor and is designed to engage the same. The member 24 is also formed with an outer bounding surface 28 (Fig. 2), which likewise has the common point D as the central point of the radius, and with a vertical face 29. This member is preferably held against rotation by means of the studs 30 which extend into counterbores 31 in the stationary support F.

Figure 8:
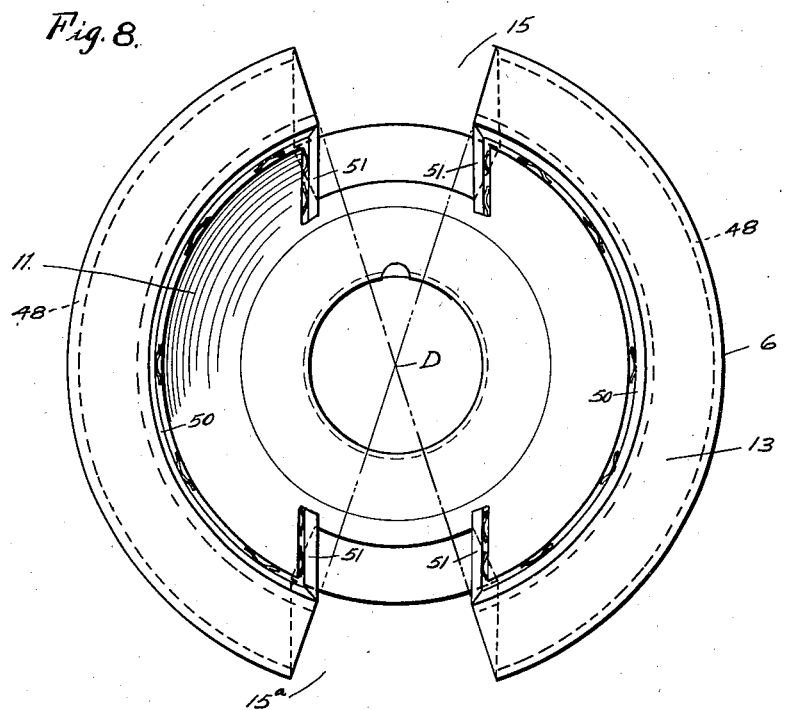
Figs. 8 and 9 are front and side views, respectively, in elevation, of the outer member of my preferred form of rotor illustrating the preferred manner of applying packing elements thereto to prevent the escape of the operating medium.
Figure 9:
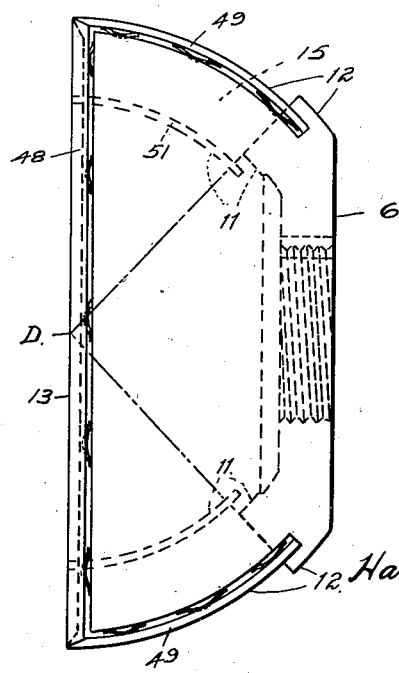
Figure 13:
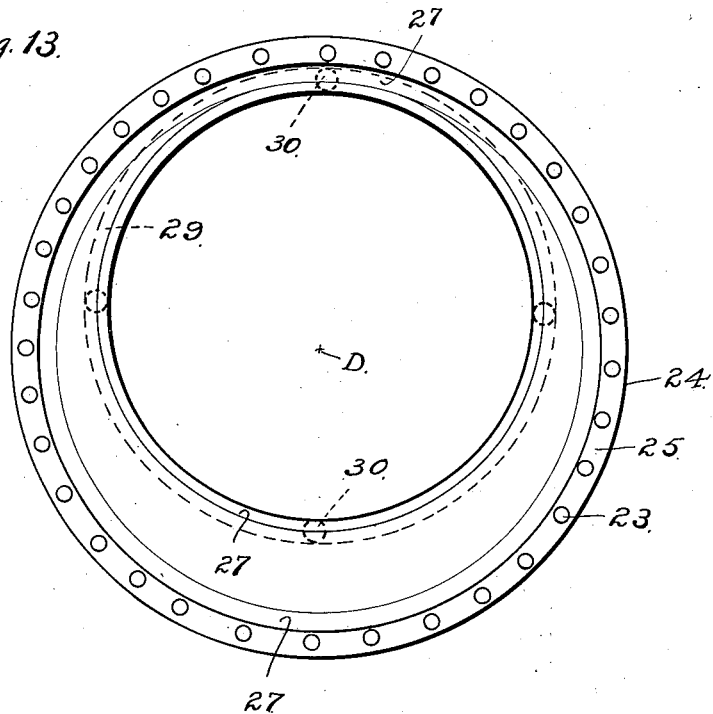
Figs. 13 and 14 are front and side elevations, respectively, of a thrust bearing member employed in the preferred form of my invention.
Figure 14:
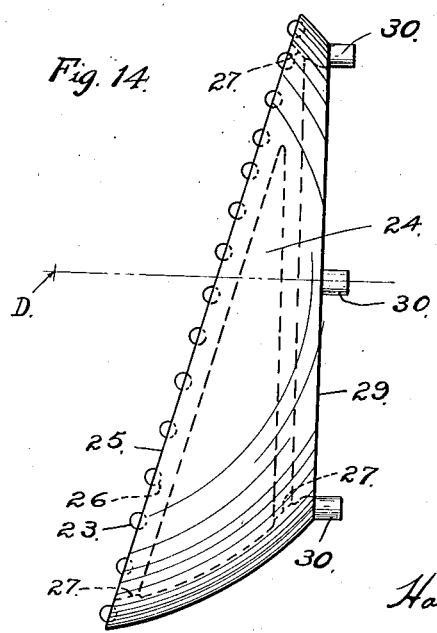

The stator G is formed with a substantially crescent shaped channel 32 (Figs. 2, 17 and 18) which is axially disposed with respect to the rotor and formed with arcuate walls 33, 34, having a radius corresponding to the surface 7 of rotor member 4 and surface 28 of the thrust bearing member 24; the latter surface being the same as the external radius of the ring 18. The channel 32 constitutes the working chamber and, as shown in the drawings, gradually diminishes in depth from the vertical center line to the points H, H (Fig. 17). At these points two concentrically arranged, upwardly projecting webs 35, 36 start and rise gradually in a manner to provide a second channel 37 having a flat bearing surface 38 against which the face 13 of the rotor is intended to bear. The channel 37 increases in depth from the points H, H to the vertical center line (Fig. 17). The webs providing such channel are formed with curved surfaces 39, 40, 41 and 42 corresponding to the surfaces 7, 11 and 12 of the rotor and the surface 34 of the working chamber, respectively. The inner edges 43, 44 of these inwardly projecting webs are provided with the same angularity as the inner surface 45 of the outer wall of the working chamber. In this connection it will be noted that a line drawn through the point D to the edges 43, 44 of the projecting webs and the surface 45 of the working chamber will have the same angularity as the piston member E assumes when in operative position. By this construction the piston member E may be held in constant engagement with the above surfaces. In order to prevent the operating medium from escaping between the edges 22 of the piston element and the walls of the working chamber I preferably provide these edges with beads 46, which fit into annular grooves 47 formed in the working chamber, and webs 35, 36. These annular beads and grooves also prevent the edges 22 of the piston element from moving out of alinement with the walls 33 and 34 of the working chamber. Such action, however, is not likely to occur as the coengaging bounding surfaces of the various elements will, ordinarily, keep these edges in proper alinement. In order to provide further means for preventing any possible leakage of the operating medium, I preferably provide the rotor periphery with suitable spring pressed packing members 48, 49, 50 and 51 (Figs. 2, 8 and 9). I also preferably provide suitable spring pressed packing strips 52 at the inner end of the projecting piston members 17, 17ª so as to bear against the tapered side walls of the slots 15, 15ª (Figs. 2, 3 and 12).

Referring again to the stator G, it will be noted that I have shown this member constructed of two parts, an upper half 53 and a lower half 54 joined together along their adjacent edges by means of bolts 55 (Fig. 1), said meeting edges constituting the points H, H above referred to in connection with the formation of the working chamber (Fig. 17). The stator has been constructed in this manner so as to permit the halves to be readily applied over the bounding surfaces of the rotor element 6 and the piston element E. The stator could, obviously, be suitably constructed in other ways to permit this application as by having the projecting webs, for example, made separate and bolted to the stator, or by dividing the stator in as many parts as may be desirable. It will further be obvious that other elements might be changed in construction to accomplish the desired result.

56 designates an outer shell having an inner concave surface corresponding to the external curvature of the members 24, 18 and web 36. This member has, preferably, a threaded engagement with the stator by means of the left hand threads 57 so that any rotary movement of the shell will also cause an axial movement of the shell and thereby increase or diminish the frictional engagement of all of the coengaging bounding surfaces and the frictional engagement of the rotor and piston member with the stator, when occasion may require. A resilient member 58 (Fig. 1) is suitably connected to the shell so as to hold the same in frictional engagement with the said external surfaces of the member 24, 18 and web 36, and to thereby hold the surface 13 or face of the rotor in frictional engagement with the flat surface 38 of the stator. This arrangement is particularly suitable to compensate for the expansion and contraction of the parts or to take up wear. The members subjected to a higher degree of heat than the shell will expand more rapidly than the shell 56. Whenever this expansion is sufficient to cause a frictional engagement between the piston and shell to overcome the tension of the spring 58, the shell will rotate and at the same time move axially a distance sufficient to relieve this friction. The outward or lateral thrust of the rotor, due to the expansive force of the operating medium exerting pressure against the face of the rotor, is taken up by the inner concave surface of the nonrotatable member 24 and this thrust is therefore not permitted to increase the friction between the piston element and the shell in a manner to cause the latter to rotate as above described. As a further precaution, however, I preferably provide the hub 5 of the rotor with an irregular shaped recess in which is placed a plurality of springs 5ᵃ and a cap 5ᵇ. A thrust bearing 2ᵃ having balls seated therein is threaded into the hub of the stationary member F so as to provide a resilient means for taking up any lateral thrust of the rotor.

J designates a carbureter (Figs. 1 and 19) which may be of any well known type, and it will, therefore, be unnecessary to describe this device in detail. The function of this device is the same in my invention as in any other type of explosive engine, the main object being to mix the explosive fluid introduced through pipe K with the proper amount of air before introducing it into the manifold 58 (Figs. 1, 17 and 19) communicating with the channel 37. The spark plug 59 is shown as communicating with the working chamber at one end thereof and connected by suitable line wires with a source of electric current 60 and with spring contact members 61, 62, operatively engaging the periphery of a rotating circuit making and breaking device comprising a disk 63 of suitable non-conducting material with an electric current conducting strip 64 adapted to close the circuit at intervals during the rotation of the rotor in a manner well understood. 65 is a steam inlet pipe and 66 is a discharge pipe.

When employing steam as the operating medium, the inlet and exhaust may be readily reversed so as to introduce the operating fluid into either end of the operating chamber by means of the reversing valve 67 (Fig. 19). In this valve structure the steam is introduced through the center thereof and may be directed into either of the pipes 68 or 69 by turning the valve in the proper direction. 70 and 71 are valves interposed in the pipes 68, 69, and 72 is a plug carrying a pet cock 73 adapted to release the compression when the engine is operated by steam only. Any number of these pet cocks could, obviously, be employed should it be desirable to release the compression quickly.

When the engine is operated by an explosive fluid wherein it is desirable to keep the parts relatively cool, I preferably introduce air into the interior of the rotor so as to cool the same and force the air through passages back of the working and compression chambers. This result is accomplished preferably by means of the conduit 74 in the shaft B which communicates with the interior of the rotor by means of the passages 75. The inner part of the rotor is preferably formed with curved webs 76 similar to fan blades which draw air into the rotor by means of centrifugal force and then forces the same out of the engine through a plurality of connecting air conduits 77 in the stator back of the working chamber (Figs. 1, 2, 17 and 18).

The oil conduits 78 in the shaft, and connecting radial conduits 79 in the webs 76 of the rotor, perimt lubricant to be carried to the bearing surfaces requiring lubrication by means of the centrifugal force of the rotor.

When operating my improved engine with a combustible operating medium the operating medium is introduced into the engine through the carbureter J communicating with the intake manifold 58. Assuming that the rotor is moving in the direction indicated by the feathered arrows in Figs. 1 and 19, the operating medium will be drawn into the compression chamber provided by the slots 15 (Fig. 19) in the rotor, by the inward movement of the projection 17 of the piston member E. This action has been termed an inward movement for the purpose of convenience only, but, as a matter of fact, there is no lateral movement of the piston element. The outer face 13 of the rotor and the edges 22 of the piston, operating in different planes merely separate inwardly as the members 17, $17^a$ rotate through the upper half of the engine. This action constitutes, in effect, a moving away of the member 17 from the face 13 of the rotor, and it is this action that sucks the operating medium into the compression chamber. As the rotor continues to move from the position shown in Figs. 1, 2 and 19, in the direction indicated by the feathered arrows in Figs. 1 and 19, the member 17 of the piston element moves outward toward the surface 38 of the stator. By this action the fluid is compressed within the cutaway portion $17^b$, and as this portion of the piston passes the point H, at the left of Figs. 1 and 19, the compressed charge is ignited by means of the spark plug 59 and its associated circuit making and breaking elements. The expansion of the operating medium is exerted directly against the side X of the piston members. When the pistons move across the exhaust port the products of combustion exhaust through the pipe 68. Any product of combustion remaining in the chamber is positively expelled by the surface Y of the following piston member $17^a$ (Fig. 19).

When the engine is operated by steam, for example, the steam is introduced into the working chamber through pipe 69 by turning the valve 67 in the proper position. The steam, in such case, exhausts through pipe 68. When desiring a reverse motion of the rotor the steam is introduced into the opposite end of the working chamber, as through pipe 68, and in this case exhausts through pipe 69. When steam is employed as the operating medium the carbureter or pipe K should be disconnected and the pet cock 73 should be opened so as to release the compression of air drawn into the engine during the compression stroke of the pistons.

In some cases it may be desirable to operate the engine by steam exclusively and in such case the engine may be constructed in accordance with the modification illustrated in Fig. 20. In this figure I have shown the working chamber $32^a$ provided with enlarged expansion spaces M at either end thereof so as to provide a shoulder N parallel with the sides X, Y of the pistons, against which the steam may expand. In this form of engine I also preferably provide the manifold $58^a$, $58^b$ which will prevent any in-drawn air from being compressed during the compression stroke.

In connection with the modified structure it will be obvious that by connecting pipes with the manifold $58^a$, $58^b$ as illustrated, the compression chamber $15^c$ may be utilized in the capacity of a direct acting pump for pumping liquids or compressing air.

In view of the fact that other modifications can be made without departure from the principle of my invention, I do not wish to limit myself to the exact structure shown and described except so far as specific limitation may appear in the appended claims.

I claim:

1. A rotary engine comprising a stator provided with a plurality of axially arranged channels, a rotor operating in one of said channels, and a piston element carried by said rotor and rotating through another of said channels in a plane angular to the path of rotation of said rotor.

2. A rotary engine comprising a stator provided with two channels, one of which constitutes a working chamber, a rotor operating in the other of said channels, and a piston element carried by said rotor and rotating through said working chamber in a path angular to the path of rotation of said rotor.

3. A rotary engine comprising a stator provided with two channels, one of which constitutes a working chamber, a rotor operating in the other of said channels, and a piston element operating in a path angular to the path of rotation of said rotor and extending into said working chamber so as to be in constant rotary engagement with the walls of said chamber.

4. A rotary engine comprising a stator formed with an annular bearing surface and having channels disposed on opposite sides of said bearing surface, one of said channels constituting a working chamber, a rotor operating in one of said channels, and a piston element operating in another of said channels.

5. A rotary engine comprising a stator formed with a channel constituting a working chamber and with inwardly projecting members, the edges of said projections being so disposed as to aline with the outer wall of said working chamber, and a piston element adapted to be held in constant engagement with the inner edges of said projections and with said outer wall of said chamber.

6. A rotary engine comprising a stator formed with a working chamber and with inwardly projecting members, the edges of said projections being so disposed as to aline with the inner surfaces of the outer wall of said chamber so as to provide a continuous annular bearing surface, and a piston element adapted to operate against said bearing surface.

7. A rotary engine comprising a stator formed with a working chamber and with inwardly projecting members, the inner edges of which aline with the inner surface of outer wall of said chamber so as to provide a continuous annular bearing surface, and an annular piston element adapted to be held in constant operative engagement with said bearing surface.

8. A rotary engine comprising means constituting a working chamber and provided with a projection, the edge of which alines with the wall of said working chamber so as to provide a continuous bearing surface, and an annular piston element operating in constant engagement with said bearing surface.

9. A rotary engine comprising means constituting a working chamber and provided with a projection, the edge of which alines with the wall of said working chamber so as to provide a continuous bearing surface and having an annular groove, and a piston element operating in constant engagement with said bearing surface and formed with an annular bead adapted to fit into said groove.

10. A rotary engine comprising a stator formed with means constituting a working chamber and with projections providing a channel, the edges of said projections being disposed so as to aline with the wall of said working chamber to provide a continuous bearing surface, a rotor extending between said projections, and a piston element adapted to be held in constant engagement with said bearing surface.

11. A rotary engine comprising a stator formed with means constituting a working chamber and with concentrically arranged projections providing a channel; the edges of said projections being disposed in alinement with the walls of said working chamber to provide a continuous bearing surface, a rotor extending into said channel, and a piston element adapted to be held in constant engagement with said bearing surface.

12. A rotary engine comprising a stator formed with a channel constituting a working chamber and with concentrically arranged projections providing a second channel; the edges of said projections being disposed in alinement with the walls of said working chamber to provide a continuous bearing surface, a rotor extending into said second channel, and a piston element adapted to be held in constant engagement with said bearing surface.

13. A rotary engine comprising a stator formed with an axially disposed channel constituting a working chamber and with concentrically arranged projections providing a second channel; the edges of said projections being disposed in alinement with the walls of said working chamber to provide a continuous bearing surface, a rotor rotating in said second channel, a piston element carried by said rotor, and means for holding said piston element in constant operative position against said bearing surface.

14. A rotary engine comprising a stator formed with an axially disposed channel constituting a working chamber and with concentrically arranged projections providing a second channel having a flat bearing surface; the edges of said projections being disposed in alinement with the walls of said working chamber to provide a continuous annular bearing surface, a rotor rotating in said second channel and bearing against said flat bearing surface, a piston element carried by said rotor, and means for holding said piston element in constant operative position against said annular bearing surface.

15. A rotary engine comprising a stator formed with an axially disposed channel constituting a working chamber and with concentrically arranged projections providing a second channel, the edges of said projections being disposed in alinement with the walls of said working chamber to provide a continuous bearing surface, a rotor rotating in said second channel, a piston element carried by said rotor and rotating therewith, and means for holding said piston element in constant operative position against said bearing surface.

16. A rotary engine comprising a stator formed with an axially disposed channel constituting a working chamber and with concentrically arranged projections providing a second channel, the edges of said projections being disposed in alinement with the walls of said working chamber to provide a continuous bearing surface, a rotor rotating in said second channel, an annular piston element carried by said rotor and rotating therewith, and means for holding said piston element in constant operative position against said bearing surface.

17. A rotary engine comprising a stator formed with an axially disposed channel constituting a working chamber and with concentrically arranged projections providing a second channel having a flat bearing surface, the edges of said projections being disposed in alinement with the walls of said working chamber to provide continuous annular bearing surfaces, a rotor rotating in said second channel and bearing against said flat bearing surface, an annular piston element carried by said rotor so as to rotate therewith, and means for taking up the wear of said piston element so as to hold the same in constant operative engagement with said annular bearing surfaces.

18. A rotary engine comprising a stator formed with an axially disposed channel constituting a working chamber and with concentrically arranged projections providing a second channel having a flat bearing surface, the edges of said projections being disposed in alinement with the walls of said working chamber to provide continuous annular bearing surfaces, a rotor rotating in said second channel and bearing against said flat bearing surface, an annular piston element carried by said rotor so as to rotate therewith, and means for taking up the wear of said piston element and rotor so as to hold the same in constant operative engagement with their respective bearing surfaces.

19. A rotary engine comprising a stator formed with an axially disposed channel constituting a working chamber and with concentrically arranged projections providing a second axially disposed channel having a flat bearing surface, the edges of said projections being disposed in alinement with the walls of said working chamber to provide continuous annular bearing surfaces, a rotor rotating in said second channel and bearing against said flat bearing surface, an annular piston element carried by said rotor so as to rotate therewith, and means for taking up the wear of said piston element so as to hold the same in constant operative engagement with said annular bearing surfaces.

20. A rotary engine comprising a stator formed with an axially disposed channel constituting a working chamber and with concentrically arranged arcuate projections providing a second axially disposed channel having a flat bearing surface, the edges of said projections being disposed in alinement with the walls of said working chamber to provide continuous annular bearing surfaces, a rotor rotating in said second channel and bearing against said flat bearing surface, an annular piston element carried by said rotor so as to rotate therewith, and means for taking up the wear of said piston element so as to hold the same in constant operative engagement with said annular bearing surfaces.

21. A rotary engine comprising a stator formed with an axially disposed arcuate channel constituting a working chamber and with concentrically arranged arcuate projections providing a second axially disposed channel having a flat bearing surface, the edges of said projections being disposed in alinement with the walls of said working chamber to provide continuous annular bearing surfaces, a rotor rotating in said second channel and bearing against said flat bearing surface, an annular piston element carried by said rotor so as to rotate therewith, and means for taking up the wear of said piston element so as to hold the same in constant operative engagement with said annular bearing surfaces.

22. A rotary engine comprising a stator formed with an axially disposed arcuate channel constituting a working chamber and with concentrically arranged arcuate projections providing a second axially disposed channel having a flat bearing surface, both of said channels decreasing in depth toward a common point horizontally with the axis of rotation, the edges of said projections being disposed in alinement with the walls of said working chamber to provide continuous annular bearing surfaces, a rotor rotating in said second channel and bearing against said flat bearing surface, an annular piston element carried by said rotor so as to rotate therewith, and means for taking up the wear of said piston element so as to hold the same in constant operative engagement with said annular bearing surfaces.

23. A rotary engine comprising a stator formed with an axially disposed channel constituting a working chamber and with concentrically arranged webs providing a second channel having a bearing surface for a rotor, the edges of said webs being in alinement with the walls of said working chamber so as to provide a continuous annular bearing for a piston element, a rotor adapted to rotate in said second channel and coöperate with the bearing surface therein, a piston element carried by said rotor, extending into said working chamber and said annular bearing surface, and means for holding said piston element in constant engagement with said annular bearing surfaces.

24. A rotary engine comprising a stator formed with an axially disposed channel constituting a working chamber and with concentrically arranged webs providing a second channel having a bearing surface for a rotor, the edges of said webs being in alinement with the walls of said working chamber so as to provide a continuous annular bearing for a piston element, a rotor adapted to rotate in said second channel and coöperate with the bearing surface therein, a piston element carried by said rotor, extending into said working chamber and said annular bearing surface, and an anti-friction thrust bearing for holding said piston element in constant engagement with said annular bearing surfaces.

25. A rotary engine comprising a stator formed with an axially disposed channel constituting a working chamber and with concentrically arranged webs providing a second channel having a bearing surface for a rotor, the edges of said webs being in alinement with the walls of said working chamber so as to provide a continuous annular bearing for a piston element, a rotor adapted to rotate in said second channel and coöperate with the bearing surface therein, a piston element carried by said rotor, extending into said working chamber and said annular bearing surface, and a thrust bearing member adapted to hold said piston element and rotor against their respective bearing surfaces.

26. A rotary engine comprising a stator formed with an axially disposed channel constituting a working chamber and with concentrically arranged webs providing a second channel having a bearing surface for a rotor, the edges of said webs being in alinement with the walls of said working chamber so as to provide a continuous annular bearing for a piston element, a rotor adapted to rotate in said second channel and coöperate with the bearing surface therein, a piston element carried by said rotor, extending into said working chamber and said annular bearing surface, and a resilient thrust bearing member adapted to hold said rotor against its bearing surface.

27. A rotary engine comprising a stator formed with an axially disposed channel constituting a working chamber and with concentrically arranged webs providing a second channel having a bearing surface for a rotor, the edges of said webs being in alinement with the walls of said working chamber so as to provide a continuous annular bearing for a piston element, a rotor adapted to rotate in said second channel and coöperate with the bearing surface therein, a piston element carried by said rotor, extending into said working chamber and said annular bearing surface, and a resilient thrust bearing member adapted to hold said piston element and rotor against their respective bearing surfaces.

28. A rotary engine comprising a stator formed with an axially disposed channel constituting a working chamber and with concentrically arranged webs providing a second channel having a bearing surface for a rotor, the edges of said webs being in alinement with the walls of said working chamber so as to provide a continuous annular bearing for a piston element, a rotor adapted to rotate in said second channel and coöperate with the bearing surface therein, a piston element carried by said rotor, extending into said working chamber and said annular bearing surface, and a resilient thrust bearing member adapted to hold said piston element and rotor against their respective bearing surfaces and to compensate for the expansion and contraction of said piston element and rotor.

29. A rotary engine comprising a stator provided with a working chamber, a shell having an operative connection with said stator whereby a rotary movement of the shell in one direction moves the same laterally toward the stator, a rotor within said shell and adapted to frictionally engage the same to impart a reverse rotational movement thereto whereby the shell is moved laterally away from said stator, a piston element carried by said rotor and adapted to extend into said working chamber, and a spring adapted to impart the first mentioned rotary movement to said shell to hold said members in operative engagement and to permit automatic movement of the shell to compensate for the expansion and contraction of said stator and rotor members.

30. A rotary engine comprising a stator having a working chamber, a rotor, a piston element carried by said rotor and adapted to extend into said working chamber, a shell adapted to be rotated to increase or decrease the frictional engagement of the various parts, and means associated with said shell which is automatically effective to take up the motion resulting from wear of each of said members, and to compensate for the expansion and contraction of said members.

31. A rotary engine comprising means constituting a working chamber, a rotor, a piston and an axially movable shell for holding the aforesaid members in operative position, all formed with coöperating bounding surfaces, the radii of said surfaces being struck from a common point on the axis of rotation of said rotor.

32. A rotary engine comprising means constituting a working chamber, a rotor, a piston and an axially movable shell for holding the aforesaid members in operative position and to compensate for the expansion and contraction of the same, all formed with coöperating bounding surfaces, the radii of said surfaces being struck from a common point on the axis of rotation of said rotor.

33. A rotary engine comprising a stator having a working chamber and formed with laterally projecting flanges spaced apart to provide a channel, a rotor the perimeter of which operates in the space between said flanges, and a piston element adapted to operate in said working chamber; said working chamber, channel, rotor and piston element being formed with bounding surfaces, the radii of which are struck from a common point on the axis of rotation of said rotor.

34. In a direct pressure rotary engine, the combination with a shaft, of a rotor on said shaft, a stator formed on its inner face with a channel which diminishes in depth toward its ends and provides an axially disposed working chamber, a piston element carried by said rotor and in constant operative engagement with the walls of said working chamber, and means for introducing an expansive fluid into said working chamber.

35. In a direct pressure rotary engine, the combination with a shaft, of a rotor on said shaft, a stator formed with a channel constituting a working chamber axially disposed with respect to said rotor, an annular piston element carried by said rotor and in constant communication with said working chamber and rotating therewith in a path angular with respect to the path of rotation of said rotor, and means for introducing an expansive fluid into said working chamber.

36. In a direct pressure rotary engine, the combination with a shaft, of a rotor on said shaft, a stator provided with a working chamber, a piston element comprising an annular member normally in constant engagement with the stator and provided with a partition against which the expansive force of the operating medium is exerted; said annular member being adapted to rotate through said working chamber in a path angular with respect to the rotation of said rotor, and means for introducing an expansive fluid into said chamber so as to exert pressure directly against said partition.

37. In a direct pressure rotary engine, the combination with a shaft, of a rotor on said shaft, a stator provided with a working chamber, a piston element comprising an annular member provided with a partition and adapted to rotate through said working chamber in a path angular with respect to the rotation of said rotor, and means for introducing an expansive fluid into said chamber so as to exert pressure directly against either side of said partition.

38. In a direct pressure rotary engine, the combination with a shaft, of a rotor having a slot and mounted on said shaft, a stator provided with a working chamber, a piston element comprising an annular member provided with a partition operatively fitted in said slot and adapted to rotate through said working chamber in a path angular with respect to the rotation of said rotor, and means for introducing an expansive fluid into said chamber so as to exert pressure directly against said partition.

39. In a direct pressure rotary engine, the combination with a shaft, of a rotor having a slot and mounted on said shaft, a stator provided with a working chamber, a piston element comprising an annular member provided with a partition slidably fitted in said slot and adapted to rotate through said working chamber in a path angular with respect to the rotation of said rotor, and means for introducing an expansive fluid into said chamber so as to exert pressure directly against said partition.

40. In a direct pressure rotary engine, the combination with a shaft, of a rotor having a slot and mounted on said shaft, a stator provided with a working chamber, a piston element comprising an annular member provided with a partition slidably fitted in said slot and adapted to rotate through said working chamber in a path angular with respect to the rotation of said rotor, and means for introducing an expansive fluid into said chamber so as to exert pressure directly against either side of said partition.

41. In a direct pressure rotary engine, the combination with a shaft, of a rotor having a pluralty of slots in its periphery and secured to said shaft, a stator provided with a working chamber, a plurality of pistons slidably fitted in said slots, annular members connecting said pistons, and means for introducing an expansive fluid into said working chamber.

42. In a direct pressure rotary engine, the combination with a shaft, of a rotor having a plurality of slots in its periphery and secured to said shaft, a stator provided with a working chamber, a plurality of pistons slidably fitted in said slots, annular members connecting said pistons, and means for introducing an expansive fluid into said working chamber at either end thereof.

43. In a direct pressure rotary engine, the combination with a shaft, of a rotor having a plurality of slots in its periphery and secured to said shaft, a stator provided with a working chamber, a plurality of pistons slidably fitted in said slots, annular members arcuate in cross section connecting said pistons, and means for introducing an expansive fluid into said working chamber.

44. In a direct pressure rotary engine, the combination with a shaft, of a rotor formed with a periphery arcuate in cross section and having radial slots in said periphery, pistons slidably fitted in said slots, annular members, arcuate in cross section, adapted to connect said pistons and fit against the arcuate surface of said rotor, and means for holding said pistons and annular members against lateral movement.

45. In a direct pressure rotary engine, the combination with a shaft, of a rotor formed with a periphery arcuate in cross section and having radial slots in said periphery, pistons slidably fitted in said slots, annular members, arcuate in cross section, adapted to connect said pistons and fit against the arcuate surface of said rotor, and an antifriction thrust member having capacity for lateral movement adapted to hold said pistons and annular members against lateral movement.

46. In a direct pressure rotary engine, the combination with a shaft, of a rotor formed with a periphery arcuate in cross section and having radial slots in said periphery, pistons slidably fitted in said slots, annular members, arcuate in cross section, adapted to connect said pistons and fit against the arcuate surface of said rotor, an anti-friction thrust member having capacity for lateral movement adapted to hold said pistons and annular members against lateral movement, and an annular shell having capacity for lateral movement adapted to coöperate with said thrust member.

47. In a direct pressure rotary engine, the combination with a shaft, of a rotor formed with a periphery arcuate in cross section and having radial slots in said periphery, pistons slidably fitted in said slots, annular members, arcuate in cross section, adapted to connect said pistons and fit against the arcuate surface of said rotor, an anti-friction thrust member having capacity for lateral movement adapted to hold said pistons and annular members against lateral movement, and an annular shell having capacity for rotational and lateral movement adapted to coöperate with said thrust member.

48. In a rotary explosive engine, the combination with a shaft, of a rotor, means constituting a working chamber, means constituting a compression chamber separate from the said working chamber, and an annular piston element carried by said rotor and adapted to rotate in a path angular with respect to the path of rotation of said rotor.

49. In a rotary explosive engine, the combination with a shaft, of a rotor, means constituting a working chamber, means constituting a compression chamber separate from said working chamber, and an annular piston element, communicating with both of said chambers, carried by said rotor and adapted to rotate in a path angular with respect to the path of rotation of said rotor.

50. In a rotary explosive engine, the combination with a shaft, of a rotor, means constituting a working chamber, means constituting a compression chamber separate from said working chamber, and an annular piston element, communicating with both of said chambers, carried by said rotor and adapted to rotate in an angular path intersecting the path of rotation of said rotor.

51. In a rotary explosive engine, the combination with a shaft, of a rotor, a stator provided with an axially disposed channel constituting a working chamber and with projections forming a second channel, means for introducing an explosive fluid into said second channel, compressing said fluid and subsequently delivering said compressed charge to the working chamber, and means for igniting said compressed charge.

52. In a rotary explosive engine, the combination with a shaft, of a rotor, a stator provided with an axially disposed channel, arcuate in cross section, constituting a working chamber and with projections forming a second channel, a piston arcuate in cross section adapted to rotate through said working chamber, means for introducing an explosive fluid into said second channel, compressing said fluid, and subsequently delivering said compressed charge to the working chamber, and means for igniting said compressed charge.

HARVEY M. GILLESPIE.